METHOD OF RECORDING AND APPARATUS FOR RECORDING SIGNALS

Filed April 4, 1955

INVENTOR
DERK KLEIS
BY [signature]
AGENT 3,012,104
Patented Dec. 5, 1961

3,012,104

METHOD OF RECORDING AND APPARATUS FOR RECORDING SIGNALS

Derk Kleis, Eindhoven, Netherlands, assignor, by mesne assignments, to North American Philips Company, Inc., New York, N.Y., a corporation of Delaware Filed Apr. 4, 1955, Ser. No. 499,182
Claims priority, application Netherlands Apr. 4, 1954
2 Claims. (Cl. 179—100.2)

The invention relates to a method of manufacturing magnetic records, and to apparatus for making such records in which simultaneously with the current from the signal to be recorded a high-frequency additional current is supplied to the recording member.

The method according to the invention is characterized in that on a signal (A) already recorded is superimposed a second signal (B) with the aid of an additional current which is equal to or smaller than the additional current used for recording the signal (A).

When using the method according to the invention the high and low frequency components of the signal may be recorded in a single track without the risk of intermodulation, i.e. a relative reaction of the frequencies of the two groups such that distortion of the reproduced signal is produced. This advantage will be explained with reference to the following description.

It is already known, in order to avoid intermodulation in the reproduction, to use separate loudspeakers, to which the high frequencies and the low frequencies respectively, of the signal to be reproduced, are supplied through filters. It is also known to record, to the same end, the high frequency components of the signal and the low frequencies in separate tracks.

A record in which the high and the low frequency components of the signal to be recorded are separated locally on the carrier is also known, since this separation, as will be explained more fully, occurs automatically if the high and the low frequency spectrums of the signal are magnetically recorded in common. In this case, however, intermodulation is unavoidable.

This intermodulation to be expected, however, as stated above, does not occur if the method according to the invention is employed. That is if first the low frequencies (signal A) and then the high frequencies (signal B) are recorded, the method according to the invention has the advantage that recording in a single track is possible, while the existing disadvantage of this method is avoided.

The same advantage is obtained, if simultaneously two relatively independent signals are recorded, in one track. This may occur for example if afterwards particular sound effects are recorded on an existing record of a radio play or other sound performance.

The mehod according to the invention will be described more fully with reference to the following drawing, wherein.

Figure 1:
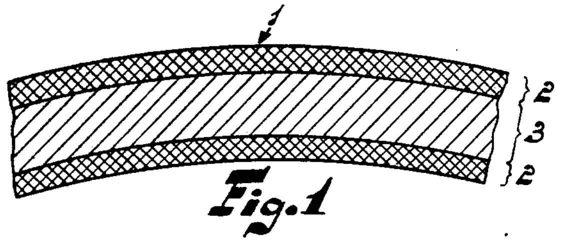
Figure 2:
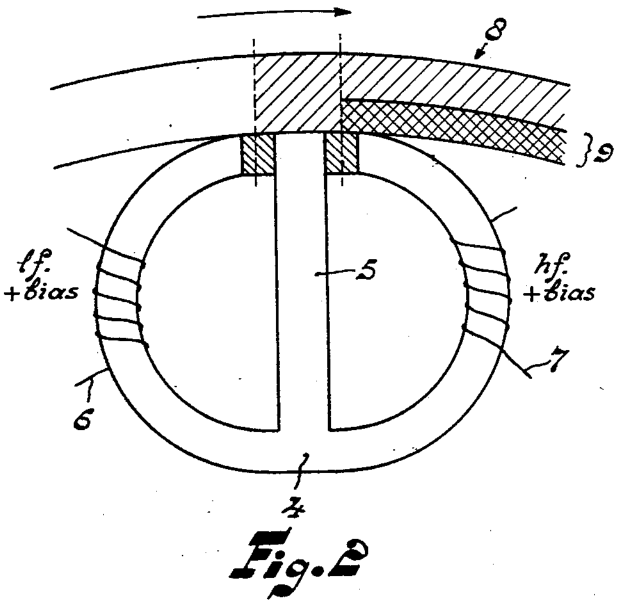

FIG. 1 is a sectional view of the magnetic record carrier; and FIG. 2 is a schematic diagram of a magnetic head for the separate recording of high frequencies and low frequencies.

Referring to FIG. 1, reference numeral 1 designates the longitudinal sectional area of a magnetic record, in which it is shown diagrammatically in what manner a spatial distribution of the high and the low frequencies is adjusted automatically after these frequencies are recorded in common. It has been found that the higher frequencies, under the action of neighboring magnetic forces, are demagnetized. This results in the record image shown, in which the recording of the higher tones is found only at the edges 2 of the carrier, since at this area on one side the demagnetizing forces fail, whereas the lower tones are recorded in the part 3, of the carrier. Since the recording of the higher frequencies is found throughout the carrier, the phenomenon of intermodulation will occur, in spite of the fact that a separation occurs in the final condition.

FIG. 2 shows a magnet head 4 for the manufacture of magnetic records, in which simultaneously with the current from the signal to be recorded a high-frequency bias current is supplied to the head. The head comprises two magnetic circuits, which have an intermediate piece 5 in common and which are each provided with a winding 6 and 7 respectively. The method according to the invention may be carried out by means of such a head by supplying to the winding 6 the low-frequency current components of the signal to be reproduced and to the winding 7 the current corresponding to the higher frequency components. Since a passing carrier 8 which moves in the direction of the arrow is exposed first to the low-frequency field and then to the other field, the condition of the method according to the invention, i.e. that first the low frequencies (signal A) and then the higher frequencies (signal B) should be recorded, is fulfilled. Moreover, a bias current is to be supplied in a strength such that the low-frequency signal is recorded throughout the carrier 8, while the higher frequencies occur only in a layer 9 adjacent the contact surface between the carrier 8 and the head 4. In spite of the same separation image thus obtained, the disadvantage of intermodulation is avoided, since the higher frequencies do not penetrate throughout the layer.

The fact that the recording of the two frequency groups takes place with a certain delay, does not adversely affect the signal to be finally reproduced, since we are concerned here with a time lag of the order of 1/1000 second.

What is claimed is:

1. Apparatus for producing records on a magnetic medium comprising: a first magnetic circuit having two pole members in confronting relationship thereby to define a first magnetic gap, and a second magnetic circuit having a pole member in confronting relationship with one of said first-mentioned pole members thereby to define a second magnetic gap, means coupled to said first magnetic circuit for producing at said first gap a magnetic field simultaneously undergoing intensity variations at a first signal frequency and at a first bias frequency substantially greater than said signal frequency, said first bias frequency having a given amplitude, means coupled to said second magnetic circuit for producing at said second gap a magnetic field simultaneously undergoing intensity variations at a second signal frequency and at a second bias frequency substantially greater than said signal frequency, said second bias having an amplitude smaller than said given amplitude, and a magnetic medium moving past said gaps in a direction such that it traverses said first gap before said second gap.

2. Apparatus for producing records on a magnetic medium, said apparatus comprising: a moving magnetic medium, means for applying at a certain time a first signal and a first high-frequency bias oscillation substantially greater in frequency than said first signal to one portion of said magnetic medium thereby to produce a recording of said first signal, and means for applying at a later time a second signal and a second high-frequency bias oscillation substantially greater in frequency than said second signal to the same portion of said magnetic medium, said second bias oscillation having a maximum amplitude smaller than that of the first bias oscillation.

References Cited in the file of this patent

UNITED STATES PATENTS

| | | |
|---|---|---|
| 1,828,189 | Kiliani | Oct. 20, 1931 |
| 2,272,821 | Roys | Feb. 10, 1942 |
| 2,416,276 | Begun | Feb. 25, 1947 |
| 2,475,421 | Camras | July 5, 1949 |
| 2,629,784 | Daniels | Feb. 24, 1953 |
| 2,643,130 | Kornei | June 23, 1953 |
| 2,675,430 | Clarke | Apr. 13, 1954 |
| 2,697,755 | Friend | Dec. 21, 1954 |
| 2,785,232 | Camras | Mar. 12, 1957 |
| 2,803,708 | Camras | Aug. 20, 1957 |

FOREIGN PATENTS

| | | |
|---|---|---|
| 174,220 | Austria | Mar. 10, 1953 |

OTHER REFERENCES

Audio, December 1954, pp. 2, 4, and 6 available in library.